May 12, 1925. 1,537,259
F. NOTZ ET AL
DOUGH MIXING MACHINE
Filed Dec. 8, 1924  2 Sheets-Sheet 1
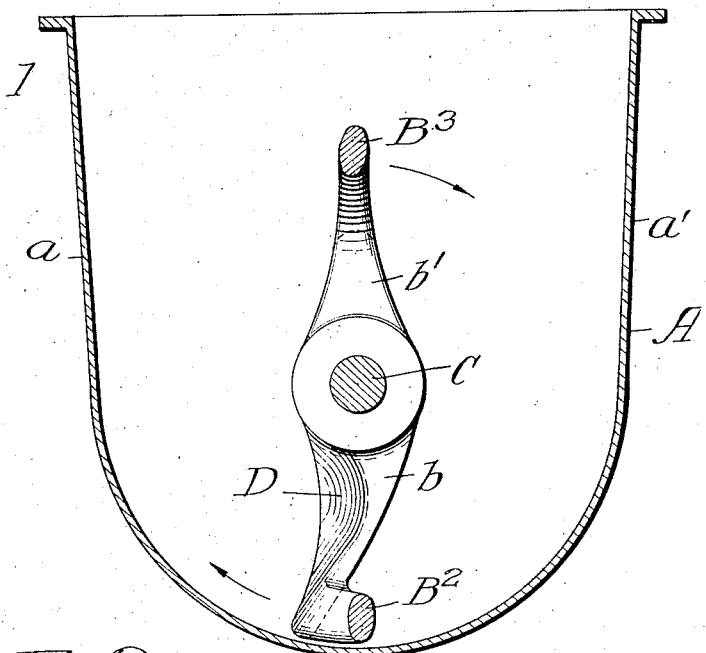
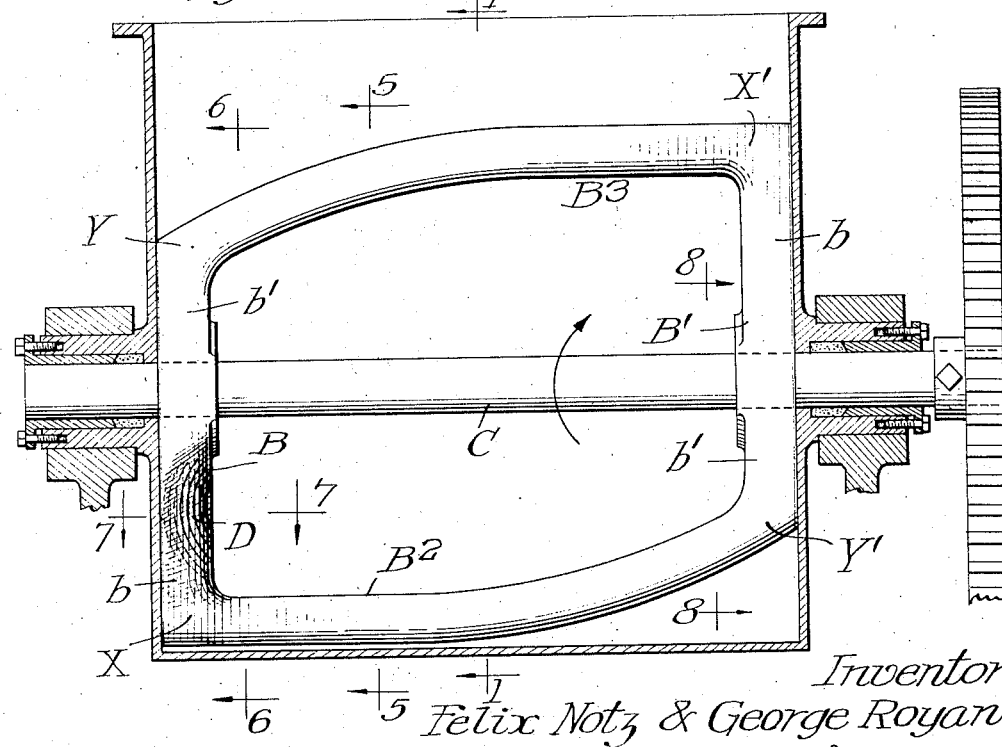
Inventors:
Felix Notz & George Royan
By Fisher, Fowle, Clapp & Soans. Attys.

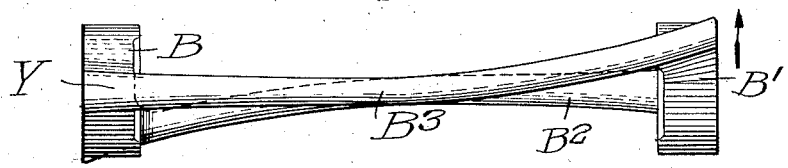
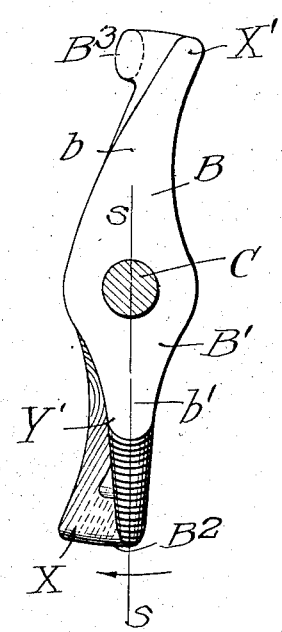
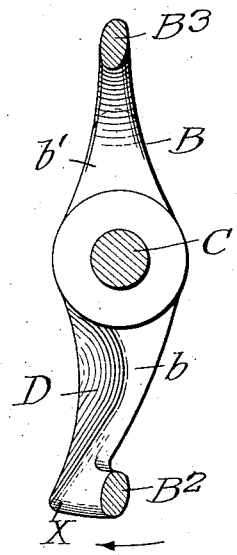
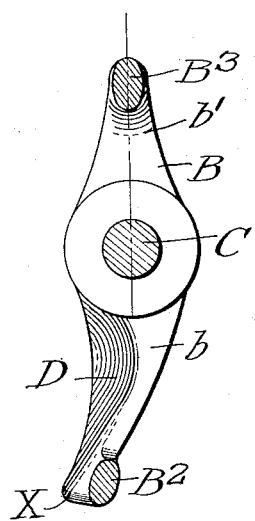
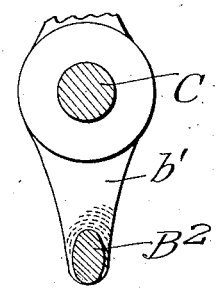
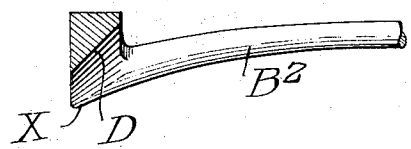

Patented May 12, 1925.

1,537,259

UNITED STATES PATENT OFFICE.

FELIX NOTZ AND GEORGE ROYAN, OF CHICAGO, ILLINOIS, ASSIGNORS TO AMERICAN OVEN & MACHINE COMPANY, OF CHICAGO, ILLINOIS, A CORPORATION OF ILLINOIS.

DOUGH-MIXING MACHINE.

Application filed December 8, 1924. Serial No. 754,488.

*To all whom it may concern:*

Be it known that we, FELIX NOTZ and GEORGE ROYAN, citizens of the United States, residing at Chicago, in the county of Cook and State of Illinois, have invented certain new and useful Improvements in Dough-Mixing Machines, of which we do declare the following to be a full, clear, and exact description, reference being had to the drawings accompanying this specification.

The present invention has for its object to provide an extremely simple and effective machine for the mixing and kneading of dough, and the invention consists in the features of novelty hereinafter described, illustrated in the accompanying drawings and particularly pointed out in the claims at the end of this specification.

Figure 1 is a view in vertical section on line 1—1 of Fig. 2 through the mixing chamber and mixing frame of the machine embodying our invention. Figure 2 is a view in central, vertical section through the mixing chamber, the mixing frame being shown in elevation. Figure 3 is a front edge view of the mixing frame. Figure 4 is an end view of the mixing frame. Figures 5 and 6 are views in section through the mixing frame on lines 5—5 and 6—6 respectively of Fig. 2. Figure 7 is a sectional view through the mixing frame on line 7—7 of Fig. 2. Figure 8 is a detail view in section on line 8—8 of Fig. 2.

A designates a mixing chamber, the shape of this chamber being of familiar form and the top of the chamber being adapted to be closed by a suitable cover (not shown). Within the mixing chamber A is mounted a revoluble mixing frame that is formed of two end bars and two connecting arms. In practice, these end bars and arms will be formed as an integral casting. The mixing frame is shown as mounted upon a central shaft C that passes through suitable stuffing boxes in the end walls of the mixing chamber and is provided at one end with a gear wheel whereby revolution may be imparted to the shaft and the mixing frame. If desired, however, the mixing frame may have short shafts projecting from and secured to its opposite ends, each of these shafts being furnished with a suitable driving gear, in manner well understood in the art.

Each of the end bars B, B' of the mixing frame comprises a long member $b$ and a short member $b'$ and the arms $B^2$ and $B^3$ extend between the outer end of the long member $b$ of one end bar and the short member $b'$ of the opposite end bar. The mixing frame is free from all transverse obstructions between the end bars B, B' and between the shaft C (if a through shaft be used) and the arms $B^2$ and $B^3$, so that as the mixing frame is revolved, the mass of dough may be more effectively shifted endwise of the machine, as will hereinafter more fully appear.

As shown, the long member $b$ of each end bar of the mixing frame is of greater width adjacent the central portion of the end bar than at the outer portion thereof, and the front edge or working face of each long member $b$ is formed with a concave working surface D that is inclined or beveled inwardly from the outer portion of this working face. The deepest portion of the concave working surface D is shown as approximately midway between the shaft C and the adjacent corner of the mixing frame B, and from this deepest portion the working face of the member $b$ is curved away from an imaginary plane passing through the shaft C and the outer end of the shorter member $b'$ of the end bar, (see Fig. 6). The working surface D of the member $b$ merges into the working surface of the adjacent arm $B^2$ or $B^3$, where these parts join to form corners X and X' of the mixing frame, and the diagonally opposite corners X and X' of the mixing frame, where the longer members $b$ join the arms $B^2$ or $B^3$, will be seen to be curved in opposite directions away from an imaginary plane (see lines s—s, Fig. 4), bisecting the mixing frame longitudinally through the center of the shaft C and the shorter members $b'$ of the end bars. The parts of the frame upon opposite sides of the shaft C are identical in shape.

Each of the arms $B^2$ and $B^3$ extends in a line approximately parallel with the axis of the mixing frame to a point about midway the length of such arm (see Fig. 2) and from such point the arm curves gradually inward to its point of union with the short member $b'$ of the opposite end bar of the mixing frame, as at the corners Y and Y' of the frame; and the part of the arm $B^2$ or $B^3$ nearest the long member $b$ of the end bar is adapted to travel in proximity to the walls of the mixing chamber A, while the path of travel of the inwardly curved portion of the arm $B^2$ or $B^3$ is at some distance from such walls of the mixing chamber.

As shown in Fig. 3 of the drawing, each of the arms $B^2$ and $B^3$ is slightly bowed or concaved in the direction of travel, and in the sectional views Figs. 5 and 6 are illustrated the preferred shape of each of these arms $B^2$ and $B^3$ at different points. That is to say, at the corners X and X' of the mixing frame adjacent the long members $b$ of the end bars, the working face of each arm $B^2$ or $B^3$ is inclined inwardly and rearwardly with respect to the path of travel of such arm, as shown at the bottom of Fig. 6, but this inward and rearward inclination of the working face of the arm gradually decreases towards the longitudinally central portion of the arm (see Fig. 5); and where the working face of the arm joins or merges into the working face of the short member $b'$ of the end bar (as shown in Fig. 8), such inclination disappears.

The mixing frame is preferably driven at a speed of approximately 65 or 70 revolutions per minute, but this speed may be varied somewhat to meet varying conditions of the work.

When the ingredients for the dough have been placed in the mixing chamber and revolution is imparted to the mixing frame, it is found in practice that a most rapid and effective mixing, kneading, stretching and aeration of the dough is secured. By reason of the novel construction and shape of the mixing frame, practice has demonstrated that as the frame revolves, the dough is lifted by the arms $B^2$ and $B^3$ as they travel upwardly, but inasmuch as the outwardly curved portions of these arms $B^2$ and $B^3$ travel at some distance from the wall $a$ of the mixing chamber, (as shown at the lower right hand corner of Fig. 2), a mass of dough extends around the outer edge of such curved portions of the mixing arm (at the corner Y', for example), and this mass tenaciously adheres to the body of dough in the lower portion of the mixing chamber. The result is that there is a stretching action between the mass of dough that is carried by the uptraveling corner X of the mixing frame nearest the longer member $b$ of the end bar and the body of dough in the opposite end of the mixing chamber adjacent the back wall $a$ of the chamber, because of the quantity of dough that extends around the outer edge of the curved portion of this arm $B^2$ at the corner Y' and connects the upcarried mass with the body of the dough in the opposite end of the mixing chamber. Hence it will be seen that there is not only a diagonal stretching of the dough, but also a pulling or shifting of the mass from one end of the mixing chamber towards the opposite end thereof. As the arm $B^2$ passes the vertical center and moves downwardly, it carries a mass of dough forward and against the front or pressure wall $a'$ of the mixing chamber. In like manner, as the arm $B^3$ moves upwardly, this arm and the corner portion X' of the mixing frame will lift a mass of dough and carry it over and against the front or pressure wall $a'$ of the mixing chamber, and in doing so, the dough will be stretched in diagonal direction over the inwardly curved portion of the arm $B^3$ and around the corner portion Y of the mixing frame.

In practice, it is found that this diagonal stretching of the dough, alternately in different directions, and the effective manner in which the arms $B^2$ and $B^3$ carry the masses of dough against the front or pressure wall of the mixing chamber, not only insures a thorough kneading, stretching and aerating of the dough, but inasmuch as there is no transverse obstruction between the arms $B^2$ and $B^3$ and the end bars B and B' of the mixing frame, there is a gradual shifting back and forth of the body of dough longitudinally of the mixing chamber. This movement of the body of dough is aided by the concave working faces of the longer members $b$ of the end bars, while at the same time the beveled edges of these end bars serve to cut or sever the dough from the end walls of the mixing chamber and so prevent the adherence of the dough to such end walls from resisting the back and forth shifting of the body of the dough.

It will thus be seen that the inclined working surfaces D of the longer members $b$ of the end bars and the inclined corners X and X' of the frame cooperate in imparting a back and forth longitudinal movement of the dough and this longitudinal back and forth movement is aided by the pulling or stretching of the dough around the curved portions of the arms $B^2$ and $B^3$, because the dough as it is being stretched around such curved portions, tends to pull or draw the mass from the corners X and X' of the frame.

What we claim as new and desire to secure by Letters Patent is:—

1. In a dough mixing machine, the combination with a mixing chamber, of a revoluble mixing frame therein comprising end bars having long and short members and arms connecting the short member of one end bar with the long member of the other end bar, each of said end bars having the forward face of its longer member formed with a concave working surface inclined inwardly towards the back edge of the bar.

2. In a dough mixing machine, the combination with a mixing chamber, of a revoluble mixing frame therein comprising end bars and arms connecting said end bars, each of said end bars having its forward edge formed with concave beveled working surfaces inclined inwardly and towards the back edge of the bar, the inclined surface of the outer portion of each end bar merging into the forward working surface of the corner of the frame where the arm joins said end bar.

3. In a dough mixing machine, the combination with a mixing chamber, of a revoluble mixing frame therein comprising end bars having long and short members and arms connecting the short member of one end bar with the long member of the other end bar, each of said end bars having the forward face of its longer member formed with a working surface inclined inwardly towards the back edge of the bar, the working faces of the corner portions of the frame at the ends of the longer members of the bar projecting in opposite directions with respect to a plane passing through the axes of revolution of the frame and through the shorter members of the bars, said working faces of said corner portions being inclined towards the diagonally opposite corners of the frame, so that each corner portion, when moving forward the dough, shall impel it also towards the opposite end of the frame.

4. In a dough mixing machine, the combination with a mixing chamber, of a revoluble mixing frame therein formed of two end bars each having a long and a short member, and two arms each extending between the longer member of one bar and the shorter member of the other bar, each of said arms extending from the longer member of one bar for a distance in a plane approximately parallel to the axis of the frame and thence curved gradually inward to the shorter member of the other end bar, the end portions of the longer members of the bars projecting in opposite directions from a plane passing through the axis of revolution of the frame and through the shorter members of the end bars, and said arms having their forward working faces curved in the direction of their length.

5. In a dough mixing machine, the combination with a mixing chamber, of a revoluble mixing frame therein formed of two end bars each having a long and a short member, and two connecting arms between said bars, each of said arms extending from the end of the longer member of one bar in a plane approximately parallel to the wall of the mixing chamber and thence curved gradually inward to the end of the shorter member of the other end bar, the end portions of the longer members of the bars being curved in opposite directions from a plane passing through the axis of revolution of the frame and through the shorter members of the end bars, said arms having their forward working faces curved in the direction of their length and having the portions of their working faces adjacent the longer members of the end bars inclined rearwardly and inwardly, the curvature and inclination of said working faces diminishing towards the opposite ends of said arms.

6. In a dough mixing machine, the combination with a mixing chamber, of a revoluble mixing frame therein formed of two end bars each having a long and a short member, and two arms connecting the end of the longer member of one bar to the end of the shorter member of the other bar, said frame being free from transverse obstructions between its axis and said arms, each of said arms extending for a distance from the longer member of one bar in a plane approximately parallel to the wall of the mixing chamber and thence curved gradually inwardly to the shorter member of the other end bar, the working faces of the diagonally opposite corner portions of the frame at the ends of the longer members of the bars being curved in opposite directions with respect to a plane passing through the arms and through the shorter members of the bars, said working faces of said corner portions being inclined inwardly and rearwardly in opposite directions with respect to said plane.

FELIX NOTZ.
GEORGE ROYAN.